US012771994B2

(12) United States Patent
Byun et al.

(10) Patent No.: US 12,771,994 B2
(45) Date of Patent: Oct. 20, 2026

(54) ELECTRONIC DEVICE INCLUDING SPEAKER

(71) Applicant: SAMSUNG ELECTRONICS CO., LTD., Suwon-si (KR)

(72) Inventors: Kangwook Byun, Suwon-si (KR); Ungki Min, Suwon-si (KR); Seunghwan Lee, Suwon-si (KR); Jongdoo Kim, Suwon-si (KR); Youji Lee, Suwon-si (KR); Jaesun Lee, Suwon-si (KR); Gun Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 18/738,773

(22) Filed: Jun. 10, 2024

(65) Prior Publication Data

US 2024/0365059 A1 Oct. 31, 2024

Related U.S. Application Data

(63) Continuation of application No. PCT/KR2024/005124, filed on Apr. 17, 2024.

(30) Foreign Application Priority Data

Apr. 25, 2023 (KR) ........................ 10-2023-0053731
May 22, 2023 (KR) ........................ 10-2023-0065759

(51) Int. Cl.
*H04R 3/00* (2006.01)
*H04R 9/04* (2006.01)

(52) U.S. Cl.
CPC ............... *H04R 3/00* (2013.01); *H04R 9/045* (2013.01); *H04R 2420/05* (2013.01); *H04R 2499/11* (2013.01)

(58) Field of Classification Search
CPC .. H04R 2420/05; H04R 2499/11; H04R 3/00; H04R 3/12; H04R 9/045; H04R 31/006
See application file for complete search history.

(56) References Cited

U.S. PATENT DOCUMENTS 11,785,393 B2 10/2023 Lee et al.
2014/0334636 A1 11/2014 Park et al.
(Continued)

FOREIGN PATENT DOCUMENTS

CN 202364282 U 8/2012
CN 102883074 A 1/2013
(Continued)

OTHER PUBLICATIONS

International Search Report (PCT/ISA/210) issued on Jul. 25, 2024 by the International Searching Authority in International Application No. PCT/KR2024/005124.v
(Continued)

*Primary Examiner* — Sunita Joshi
(74) *Attorney, Agent, or Firm* — Sughrue Mion, PLLC

(57) ABSTRACT

An electronic device includes: a housing; a first speaker in the housing; and a printed circuit board in the housing and surrounding at least a portion of the first speaker, wherein the first speaker includes: a coil area in which a coil for an operation of the first speaker is disposed; a flexible board on an outer portion of the coil area and including a wire surrounding at least a portion of the coil area; and a connection terminal at one end of the flexible board and electrically connected to the printed circuit board.

20 Claims, 12 Drawing Sheets

(56) References Cited

U.S. PATENT DOCUMENTS

| | | | |
|---|---|---|---|
| 2018/0234772 | A1 | 8/2018 | Meng |
| 2021/0266689 | A1 | 8/2021 | Kim |
| 2023/0144261 | A1 | 5/2023 | Cho et al. |

FOREIGN PATENT DOCUMENTS

| | | | | | |
|---|---|---|---|---|---|
| CN | 105357353 | A | | 2/2016 | |
| CN | 107396253 | A | | 11/2017 | |
| JP | 2007-13402 | A | | 1/2007 | |
| KR | 20-0462127 | Y1 | | 8/2012 | |
| KR | 10-2014-0132625 | A | | 11/2014 | |
| KR | 10-1590178 | B1 | | 2/2016 | |
| KR | 10-2021-0106691 | A | | 8/2021 | |
| KR | 20210106691 | A | * | 8/2021 | ............... H04R 3/00 |
| KR | 10-2021-0123510 | A | | 10/2021 | |
| KR | 10-2022-0008652 | A | | 1/2022 | |
| KR | 20220008652 | A | * | 1/2022 | ........... H04R 31/006 |
| KR | 20220016599 | A | * | 2/2022 | ........... G06F 1/1698 |
| KR | 10-2373333 | B1 | | 3/2022 | |

OTHER PUBLICATIONS

Written Opinion (PCT/ISA/237) issued on Jul. 25, 2024 by the International Searching Authority in International Application No. PCT/KR2024/005124.

* cited by examiner

ELECTRONIC DEVICE INCLUDING SPEAKER

CROSS-REFERENCE TO RELATED APPLICATIONS

This application is a by-pass continuation application of International Application No. PCT/KR2024/005124, filed on Apr. 17, 2024, which is based on and claims priority to Korean Patent Application Nos. 10-2023-0053731, filed on Apr. 25, 2023, and 10-2023-0065759, filed on May 22, 2023, in the Korean Intellectual Property Office, the disclosures of which are incorporated by reference herein their entireties.

BACKGROUND

1. Field

The disclosure relates to an electronic device including a speaker.

2. Description of Related Art

An electronic device (e.g., a portable electronic device) may include two speakers to respond to the growing demand for high-quality audio. For example, the electronic device may include a first speaker requiring a high output (e.g., a speaker used for outputting music) and a second speaker requiring a low output (e.g., a speaker used for calling).

The electronic device may be operated in a handset mode or a speaker phone mode. The electronic device may output sound by using different speakers and amplifiers in the handset mode and the speaker phone mode. For example, the electronic device may output sound by using the first speaker and a first amplifier in the handset mode and output sound by using the second speaker and a second amplifier in the speaker phone mode.

SUMMARY

When an electronic device operates in a handset mode, an H-field may be generated by a power (e.g., radio frequency (RF) power) current of the electronic device. The H-field generated by the power current may cause an induction current to flow through a coil in the first speaker, and thus, generate noise recognizable by a user of the electronic device.

A size reduction of an electronic device may have led to limitations in a size of a printed circuit board disposed in the electronic device, which has led to limitations in disposition of the power source that generates the induction current in the first speaker far away from the first speaker. Therefore, there may be a need for a structure which reduces noise caused by the induction current flowing through the first speaker.

According to an aspect of the disclosure, an electronic device includes: a housing; a first speaker in the housing; and a printed circuit board in the housing and surrounding at least a portion of the first speaker, wherein the first speaker includes: a coil area in which a coil for an operation of the first speaker is disposed; a flexible board on an outer portion of the coil area and including a wire surrounding at least a portion of the coil area; and a connection terminal at one end of the flexible board and electrically connected to the printed circuit board.

The electronic device may further include a second speaker at a position different from a position of the first speaker.

The electronic device of may further include: a first amplifier connected to the first speaker; and a second amplifier connected to the second speaker.

In case that the electronic device is operated in a handset mode, the second amplifier may be connected to the wire and the second speaker.

The connection terminal may include a pair of first terminals and a pair of second terminals.

The pair of first terminals electrically connect the coil area and the first amplifier, and the pair of second terminals electrically connect the wire and the second amplifier.

The electronic device may further include at least one processor configured to, in case that the electronic device is operated in a handset mode, recognize a value of a first current flowing through the first speaker based on a network used by the electronic device and cause a second current and flow the second current through the wire based on the value of the current.

The at least one processor may be further configured to recognize, from a data set stored in the electronic device, the value of the current, which corresponds to the network used by the electronic device.

The data set may include a value of a current for each network used by the electronic device and a value of a current for each type of the electronic device.

According to an aspect of the disclosure, an electronic device includes: a housing; a first speaker in the housing; and a printed circuit board in the housing and including a speaker opening area surrounding the first speaker, wherein the printed circuit board may include a conductive pattern surrounding an outer portion of the first speaker.

The electronic device may further include: a second speaker at a position different from a position of the first speaker; a first amplifier connected to the first speaker; and a second amplifier connected to the second speaker.

In case that the electronic device is operated in a handset mode, the second amplifier may be connected to the conductive pattern and the second speaker.

The electronic device may further include at least one processor configured to, in case that the electronic device is operated in a handset mode, recognize a value of a current flowing through the first speaker based on a network used by the electronic device and cause a current to flow through the conductive pattern based on the value of the current.

The at least one processor may be further configured to recognize, from a data set prestored in the electronic device, the value of the current, which corresponds to the network used by the electronic device.

The data set may include a value of a current for each network used by the electronic device and a value of a current for each type of the electronic device.

According to an aspect of the disclosure, an electronic device includes: a housing; a first speaker in the housing; a printed circuit board in the housing and including a speaker opening area surrounding the first speaker; and a coil board surrounding an outer portion of the first speaker between the first speaker and the printed circuit board.

The electronic device may further include: a second speaker at a position different from a position of the first speaker; a first amplifier connected to the first speaker; and a second amplifier connected to the second speaker.

In case that the electronic device is operated in a handset mode, the second amplifier may be connected to the first speaker and the second speaker.

According to an aspect of the disclosure, a method of an electronic device, the method includes: identifying an operation mode of the electronic device; identifying a network used by the electronic device; determining whether the operation mode of the electronic device is a handset mode; based on the operation mode being the handset mode, recognizing a value of a first current flowing through a speaker, based on the network used by the electronic device; and based on the value of the first current, generating a second current to flow through a wire extending to surround an outer portion of the speaker.

The recognizing the value of the first current may include recognizing, from a data set stored in the electronic device, the value of the first current.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
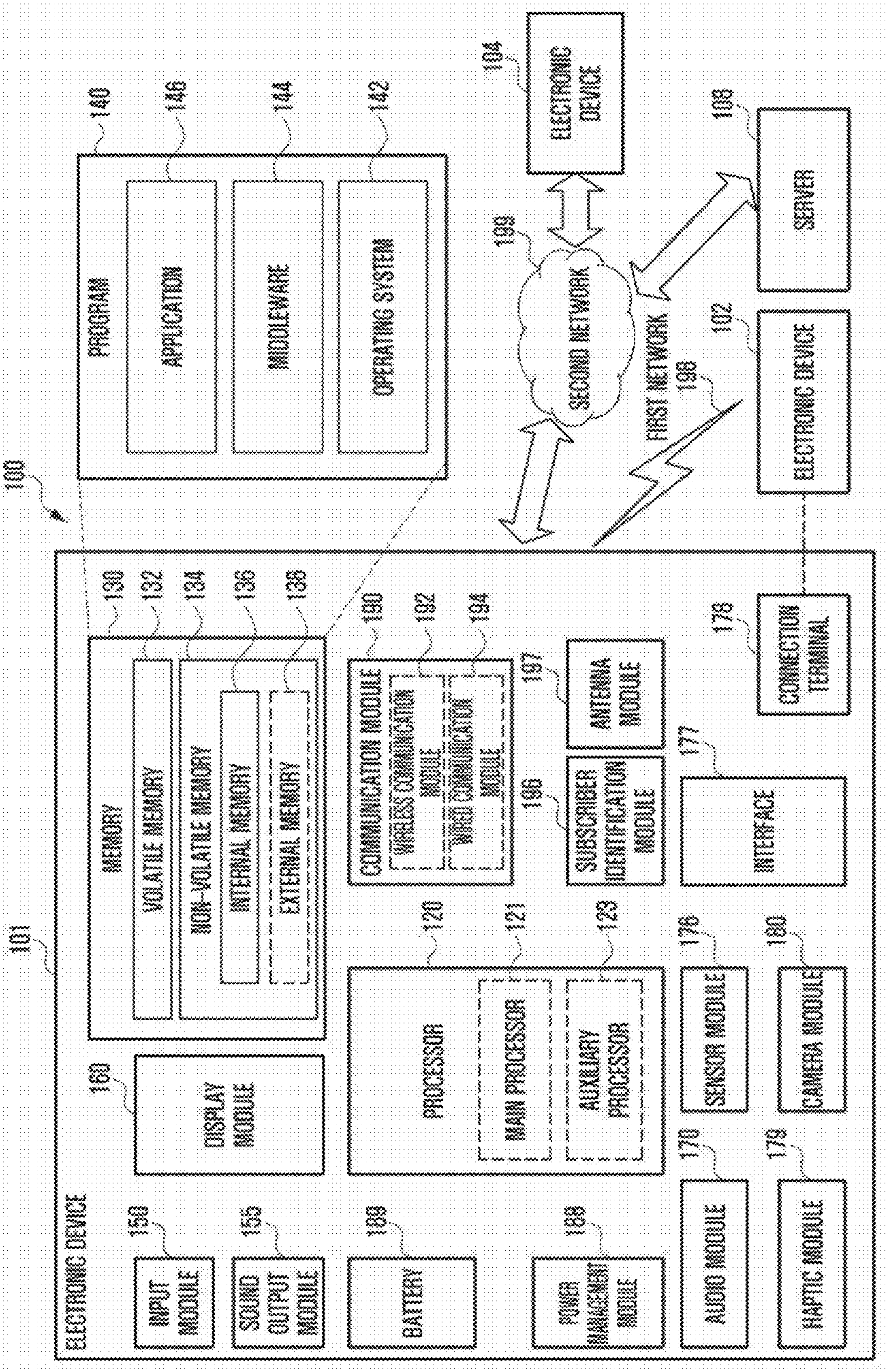
FIG. 1 illustrates an electronic device in a network environment according to an embodiment.

FIG. 1 is a block diagram illustrating an electronic device in a network environment according to an embodiment. Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
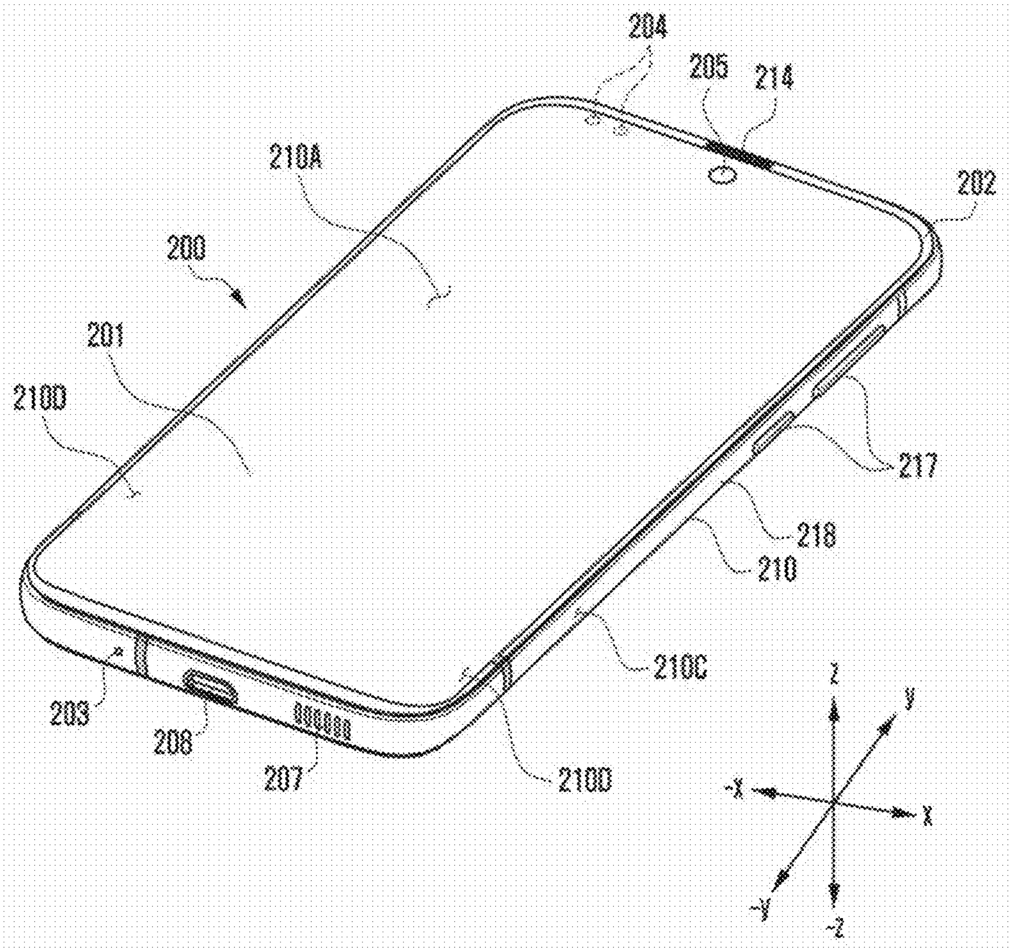
FIGS. 2A and 2B illustrate an electronic device according to an embodiment of the disclosure.
Figure 2B:
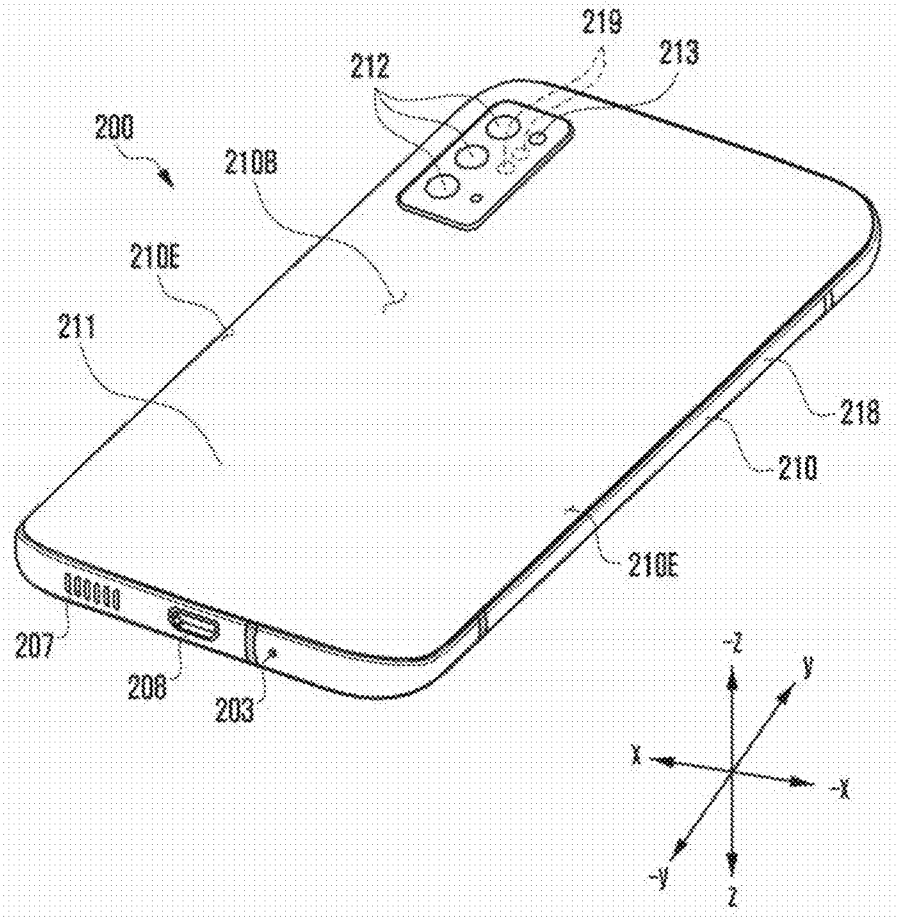

FIG. 2A is a perspective view of the front of the electronic device 200 according to an embodiment of the present disclosure. FIG. 2B is a perspective view of the rear of the electronic device 200 of FIG. 2A according to an embodiment of the present disclosure.

The electronic device 200 in FIGS. 2A and 2B may be at least partially similar to the electronic device 101 in FIG. 1 or may further include other embodiments.

Referring to FIGS. 2A and 2B, the mobile electronic device 200 may include a housing 210 that includes a first surface (or front surface) 210A, a second surface (or rear surface) 210B, and a lateral surface 210C that surrounds a space between the first surface 210A and the second surface 210B. The housing 210 may refer to a structure that forms a part of the first surface 210A, the second surface 210B, and the lateral surface 210C. The first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

The front plate 202 may include two first regions 210D disposed at long edges thereof, respectively, and bent and extended seamlessly from the first surface 210A toward the rear plate 211. Similarly, the rear plate 211 may include two second regions 210E disposed at long edges thereof, respectively, and bent and extended seamlessly from the second surface 210B toward the front plate 202. The front plate 202 (or the rear plate 211) may include only one of the first regions 210D (or of the second regions 210E). The first regions 210D or the second regions 210E may be omitted in part. When viewed from a lateral side of the mobile electronic device 200, the lateral bezel structure 218 may have a first thickness (or width) on a lateral side where the first region 210D or the second region 210E is not included, and may have a second thickness, being less than the first thickness, on another lateral side where the first region 210D or the second region 210E is included.

According to an embodiment, the electronic device 200 may include at least one of a display 201, audio modules 203, 207 and 214, sensor modules 204 and 219, camera modules 205, 212 and 213, a key input device 217, an indicator, and connector holes 208 and 209. The mobile electronic device 200 may omit at least one (e.g., the key input device 217 or the indicator) of the above components, or may further include other components.

The display 201 may be exposed through a substantial portion of the front plate 202, for example. At least a part of the display 201 may be exposed through the front plate 202 that forms the first surface 210A and the first region 210D of the lateral surface 210C. The display 201 may be combined with, or adjacent to, a touch sensing circuit, a pressure sensor capable of measuring the touch strength (pressure), and/or a digitizer for detecting a stylus pen. At least a part of the sensor modules 204 and 219 and/or at least a part of the key input device 217 may be disposed in the first region 210D and/or the second region 210E.

The input device 103 may include at least one microphone. In certain embodiments, the input device 203 may include a plurality of microphones disposed to detect the direction of a sound. According to an embodiment, the sound output devices 207 and 214 may include speakers. Speakers may include an external speaker 207 and a call receiver 214. In certain embodiments, the input device 203, the sound output devices 207 and 214, and the connector 208 may be disposed in a space arranged in the housing 210 of the electronic device 200, and may be exposed to the external environment through at least one hole formed in the housing 210. In certain embodiments, the sound output devices 207 and 214 may include a speaker (e.g., piezo speaker) that operates without using a hole formed in the housing 210.

The sensor modules 204 and 219 may generate electrical signals or data corresponding to an internal operating state of the mobile electronic device 200 or to an external environmental condition. The sensor modules 204 and 219 may include a first sensor module 204 (e.g., a proximity sensor) and/or a second sensor module (e.g., a fingerprint sensor) disposed on the first surface 210A of the housing 210, and/or a third sensor module 219 (e.g., a heart rate monitor (HRM) sensor) and/or a fourth sensor module (e.g., a fingerprint sensor) disposed on the second surface 210B of the housing 210. The fingerprint sensor may be disposed on the second surface 210B as well as the first surface 210A (e.g., the display 201) of the housing 210. The electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212 and 213 may include a first camera device 205 disposed on the first surface 210A of the electronic device 200, and a second camera device 212 and/or a flash 213 disposed on the second surface 210B. The camera module 205 or the camera module 212 may include one or more lenses, an image sensor, and/or an image signal processor. The flash 213 may include, for example, a light emitting diode or a xenon lamp. Two or more lenses (infrared cameras, wide angle and telephoto lenses) and image sensors may be disposed on one side of the electronic device 200.

The key input device 217 may be disposed on the lateral surface 210C of the housing 210. The mobile electronic device 200 may not include some or all of the key input device 217 described above, and the key input device 217 which is not included may be implemented in another form such as a soft key on the display 201. According to an embodiment, the key input device 217 may be implemented using a pressure sensor included in the display 201.

The indicator may be disposed on the first surface 210A of the housing 210. For example, the indicator may provide status information of the electronic device 200 in an optical form. The indicator may provide a light source associated with the operation of the camera module 205. The indicator may include, for example, a light emitting diode (LED), an IR LED, or a xenon lamp.

The connector holes 208 may include a first connector hole 208 adapted for a connector (e.g., a USB connector) for transmitting and receiving power and/or data to and from an external electronic device, and/or a second connector hole adapted for a connector (e.g., an earphone jack) for transmitting and receiving an audio signal to and from an external electronic device.

Some camera modules 205 of camera modules 205 and 212, some sensor modules 204 of sensor modules 204 and 219, or an indicator may be arranged to be exposed through a display 201. For example, the camera module 205, the sensor module 204, or the indicator may be arranged in the internal space of an electronic device 200 so as to be brought into contact with an external environment through an opening of the display 201, which is perforated up to a front plate 202. According to an embodiment, an area corresponding to some camera module 205 of the display 201 is a part of an area in which content is displayed, and may be formed as a transmission area having designated transmittance. For example, the transmission area may be formed to have transmittance having a range of about 5% to about 20%. The transmission area may include an area overlapped with a valid area (e.g., a field of view (FOV)) of the camera module 205 through which light imaged by an image sensor and for generating an image passes. For example, a transmission area of the display 201 may include an area in which the density of pixels and/or a wiring density are lower than that of surroundings. The camera module 205 may include, for example, under display camera (UDC). In another embodiment, some sensor modules 204 may be arranged to perform their functions without being visually exposed through the front plate 202 in the internal space of the electronic device. For example, in this case, an area of the display 201 facing the sensor module may not require a perforated opening.

Figure 3:
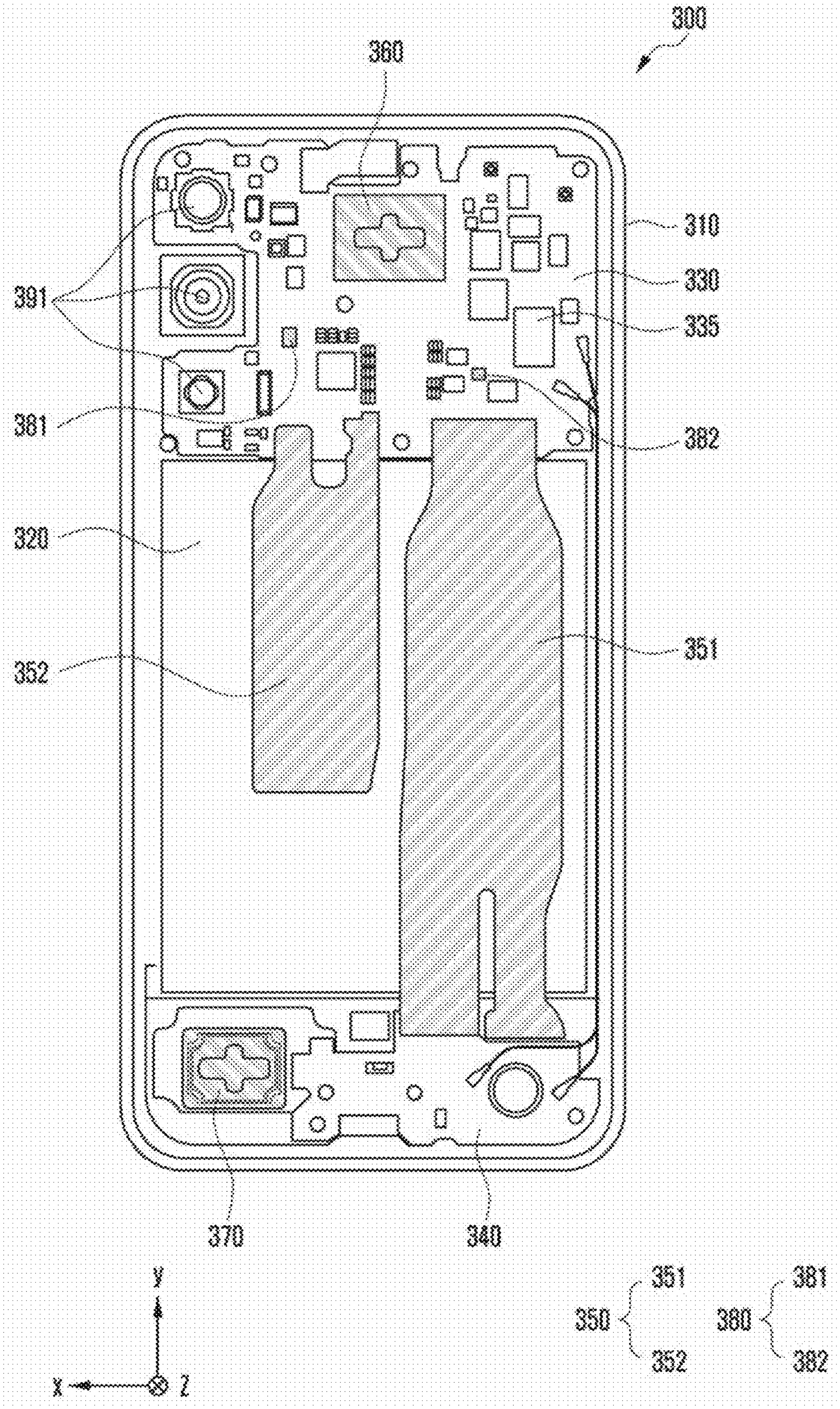
FIG. 3 illustrates an electronic device according to an embodiment of the disclosure.

FIG. 3 illustrates an electronic device 300 according to an embodiment of the disclosure.

The electronic device 300 shown in FIG. 3 may correspond to the electronic device 101 in FIG. 1 or may include at least a portion of the electronic device 101 in FIG. 1.

The electronic device 300 shown in FIG. 3 may correspond to the electronic device 200 in FIG. 2 or may include at least a portion of the electronic device 200 in FIG. 2.

Referring to FIG. 3, according to an embodiment, the electronic device 300 may include a housing 310, a battery 320, a first printed circuit board 330, a second printed circuit board 340, flexible printed circuit boards 350 (a first flexible printed circuit board 351 and a second flexible printed circuit board 352), speakers (a first speaker 360 and a second speaker 370), amplifiers 380 (a first amplifier 381 and a second amplifier 382), and a camera 391.

In an embodiment, the housing 310 may form an outer portion of the electronic device 300. Components of the electronic device 300 may be arranged in the housing 310. For example, the battery 320, the first printed circuit board 330, the second printed circuit board 340, the flexible printed circuit boards 350 (the first flexible printed circuit board 351 and the second flexible printed circuit board 352), the speakers (the first speaker 360 and the second speaker 370), the amplifiers 380 (the first amplifier 381 and the second amplifier 382), and the camera 391 may be arranged in the housing 310.

In an embodiment, the battery 320 may supply power to at least one component (e.g., the amplifiers 380, the speakers (the first speaker 360 and the second speaker 370), and/or the camera 391) of the electronic device 300.

In an embodiment, the first printed circuit board 330 may be disposed in one direction (e.g., a positive y-axis direction) based on the battery 320. The second printed circuit board 340 may be disposed in another direction (e.g., a negative y-axis direction) based on the battery 320.

In an embodiment, an electronic component 335 may be disposed on a surface of the first printed circuit board 330 or the second printed circuit board 340. The electronic component 335 may include the processor 120 and/or the memory 130 in FIG. 1.

In an embodiment, the flexible printed circuit boards 350 may electrically connect components of the electronic device 300. In an embodiment, the first flexible printed circuit board 351 may electrically connect the first printed circuit board 330 and the second printed circuit board 340. The second flexible printed circuit board 352 may electrically connect the first printed circuit board 330 and the battery 320.

In an embodiment, the first speaker 360 may be disposed in one direction (e.g., the positive y-axis direction) based on the battery 320. The second speaker 370 may be disposed in another direction (e.g., the negative y-axis direction) based on the battery 320.

In an embodiment, in case that the electronic device 300 performs a call operation, the electronic device 300 may be operated in a speaker phone mode or a handset mode. In the speaker phone mode of the electronic device 300, a user may make a call using the electronic device 300 in a state of not holding the electronic device 300 by the user. In the handset mode of the electronic device 300, a user may make a call using the electronic device 300 in a state in which the user holds the electronic device 300 to place the electronic device 300 close to the body of the user.

In an embodiment, the first speaker 360 may correspond to a speaker used in the handset mode of the electronic device 300. In an embodiment, the second speaker 370 may correspond to a speaker used in the speaker phone mode of the electronic device 300.

In an embodiment, the first printed circuit board 330 may be disposed in the housing 310 to surround at least a portion of the first speaker 360. For example, the first printed circuit board 330 may include a speaker opening area 331 (see FIG. 7) through which the first speaker 360 is disposed and may surround the outer portion of the first speaker 360.

In an embodiment, the second speaker 370 may be disposed on a side of the second printed circuit board 340. The relative positions of the first speaker 360 and the second speaker 370 shown in FIG. 3 are merely exemplary and the relative positions of the first speaker 360 and the second speaker 370 are not limited thereto.

In an embodiment, the first amplifier 381 may be disposed on (a surface of) the first printed circuit board 330 and the second amplifier 382 may be disposed on (a surface of) the second printed circuit board 340.

In an embodiment, the first amplifier 381 may be electrically connected to the first speaker 360. In an embodiment, the second amplifier 382 may be electrically connected to the first speaker 360 and/or the second speaker 370.

In an embodiment, the camera 391 may be disposed in one side direction of the first printed circuit board 330 or may be surrounded by the first printed circuit board 330.

In an embodiment, the electronic device 300 may include multiple cameras 391. The multiple cameras 391 may be disposed in one side direction of the first printed circuit board 330 or may be surrounded by the first printed circuit board 330.

Figure 4:
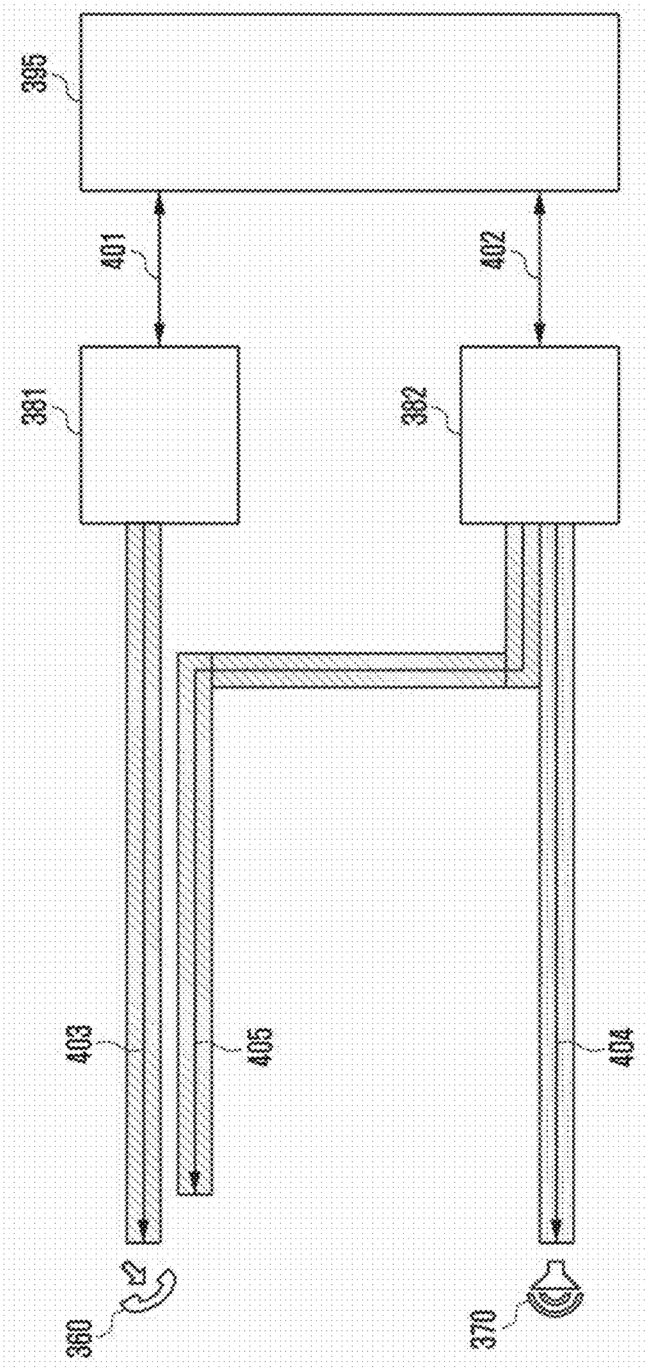
FIG. 4 illustrates connections between speakers and amplifiers according to an embodiment of the disclosure.

FIG. 4 illustrates connections between the speakers (the first speaker 360 and the second speaker 370) and the amplifiers 380 (the first amplifier 381 and the second amplifier 382), according to an embodiment of the disclosure.

In an embodiment, the electronic device 300 may include an application processor (or at least one application processor) 395. The application processor 395 may serve to control components of the electronic device 300.

In an embodiment, the application processor 395 may transfer a first electrical signal to the first amplifier 381 and the second amplifier 382. For example, the application processor 395 may send and receive an electrical signal to and from the first amplifier 381 through a first connection 401. The application processor 395 may send and receive a second electrical signal to and from the second amplifier 382 through a second connection 402.

In an embodiment, the first speaker 360 may be electrically connected to the first amplifier 381. For example, the first speaker 360 may be electrically connected to the first amplifier 381 through a third connection 403. The first speaker 360 may receive a current from the first amplifier 381. The current received from the first amplifier 381 may flow through a coil inside the first speaker 360.

In an embodiment, the second speaker 370 may be electrically connected to the second amplifier 382. For example, the second speaker 370 may be electrically connected to the second amplifier 382 through a fourth connection 404. The second speaker 370 may receive a current from the second amplifier 382. The current received from the second amplifier 382 may flow through a coil inside the second speaker 370.

In an embodiment, in case that the electronic device 300 is operated in the handset mode, in the electronic device 300, the first speaker 360 may be electrically connected to the first amplifier 381 and the second amplifier 382, simultaneously. For example, the first speaker 360 may be electrically connected to the second amplifier 382 through a fifth connection 405. The first speaker 360 may be electrically connected to the second amplifier 382, and thus, the first speaker 360 may receive a current from the second amplifier 382. The current received by the first speaker 360 from the second amplifier 382 may flow through a wire 3621 (see FIG. 6) disposed on an outer portion of the coil of the first speaker 360. The current transferred from the second amplifier 382 flows through the wire 3621 (see FIG. 6) to offset an H-field caused by a power current of the handset mode. The H-field caused by the power current of the handset mode is offset, and thus, noise generated in the first speaker 360 may be reduced or removed.

Figure 5A:
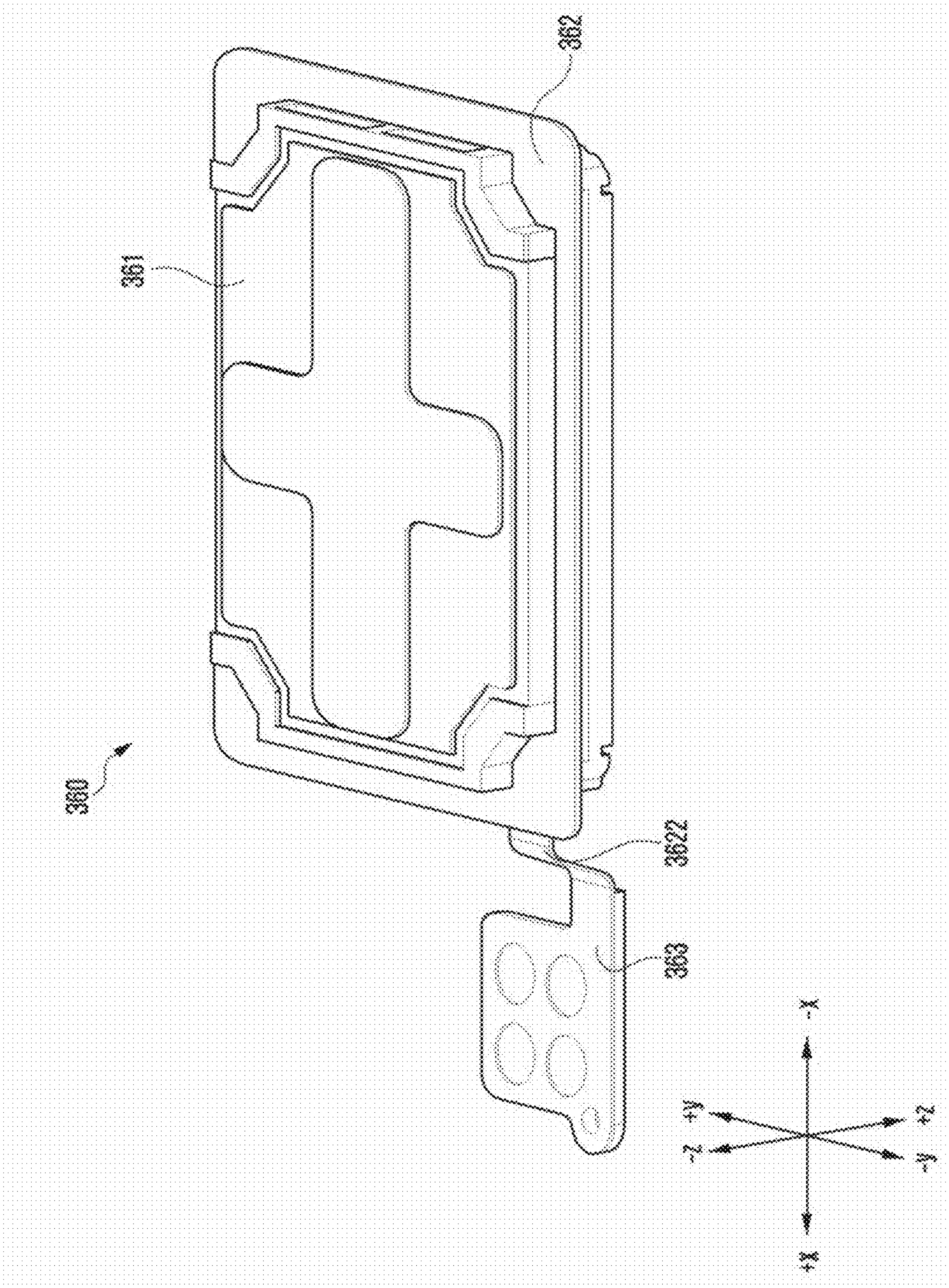
FIGS. 5A and 5B illustrate a first speaker according to an embodiment of the disclosure.
Figure 5B:
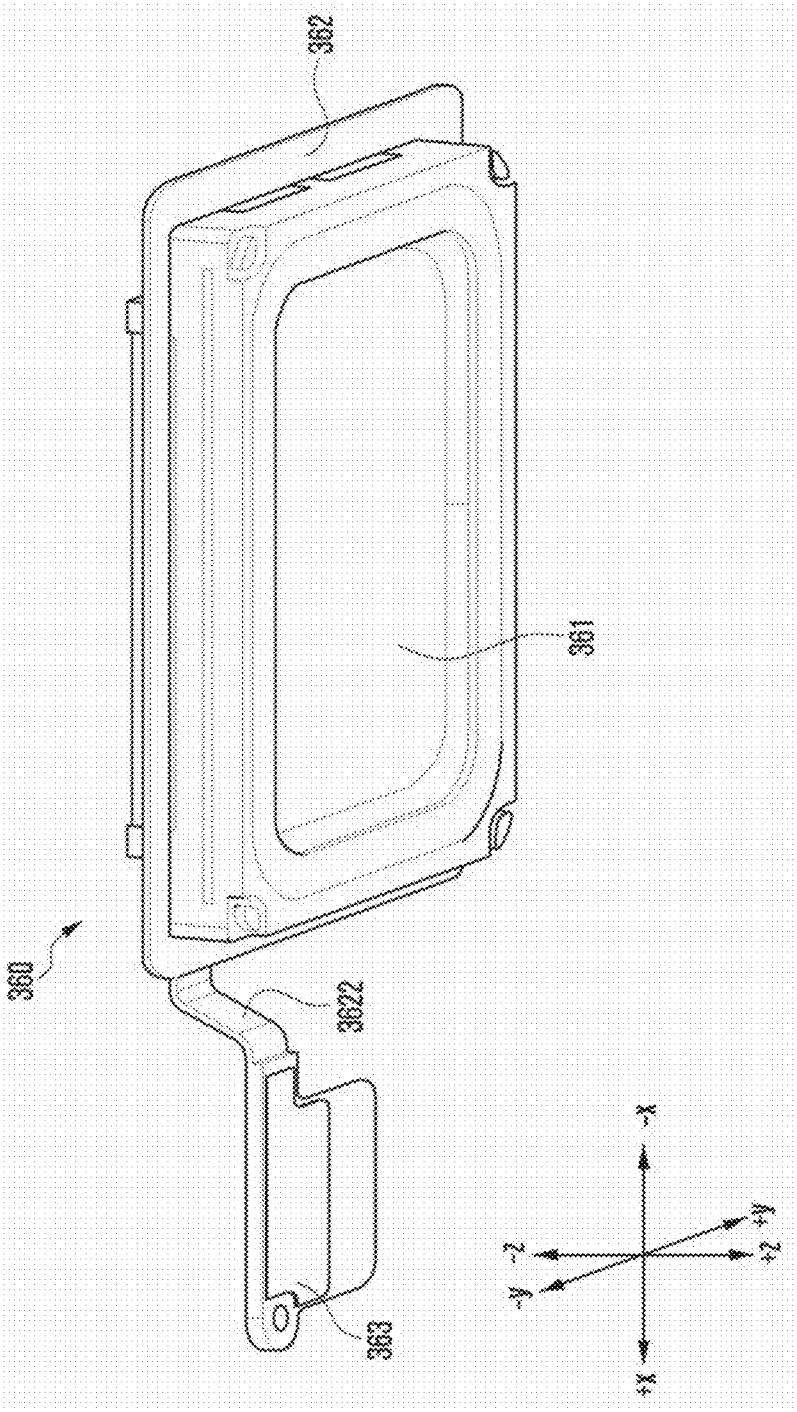

FIGS. 5A and 5B illustrate the first speaker 360 according to an embodiment of the disclosure. FIG. 5A illustrates a front surface of the first speaker 360 according to an embodiment. FIG. 5B is a perspective views illustrating a rear surface of the first speaker 360 according to an embodiment.

According to an embodiment of the disclosure, in the first speaker 360, the width direction of the first speaker 360 may represent the x-axis direction and the lengthwise direction of the first speaker 360 may represent the y-axis direction. The height direction of the first speaker 360 may represent the z-axis direction.

According to an embodiment of the disclosure, in the first speaker 360, the front surface of the first speaker 360 may indicate a surface oriented in the negative z-axis direction from the first speaker 360 and the rear surface of the first speaker 360 may indicate a surface oriented in the positive z-axis direction from the first speaker 360.

Referring to FIGS. 5A and 5B, the first speaker 360 according to an embodiment may include a coil area 361, a flexible board (e.g., a flexible printed circuit board) 362 and/or a connection terminal 363.

In an embodiment, the coil area 361 may correspond to an area in which a coil for operation of the first speaker 360 is disposed. For example, the coil for generating sound may be disposed inside the coil area 361.

In an embodiment, the flexible board 362 may be disposed on an outer portion of the coil area 361. For example, the flexible board 362 may be disposed to extend along a circumference of the coil area 361. The flexible board 362 may be configured on the outside of the coil area 361.

In an embodiment, the flexible board 362 may include a wire 3621 (see FIG. 6) extending to surround at least a portion of the coil area 361. The wire 3621 (see FIG. 6) may extend to surround at least a portion of the coil area 361 on the outside of the coil area 361. The wire 3621 (see FIG. 6) according to an embodiment may include a conductive pattern through which a current may flow.

In an embodiment, the connection terminal 363 may be configured at a terminal of the flexible board 362. For example, referring to FIGS. 5A and 5B, the connection terminal 363 may be configured at terminals positioned on the flexible board 362 in the positive x-axis direction and the negative x-axis direction. For example, the connection terminal 363 may include a conductive pattern configured at a terminal of the flexible board 362.

The position of the connection terminal 363 shown in FIGS. 5A and 5B is merely exemplary and the position of the connection terminal 363 may not be limited thereto.

In an embodiment, the connection terminal 363 may be disposed on a printed circuit board (e.g., the first printed circuit board 330). For example, a surface (e.g., a surface oriented in the negative z-axis direction from the connection terminal 363) of the connection terminal 363 may be disposed to face the first printed circuit board 330.

In an embodiment, the connection terminal 363 may electrically connect the first speaker 360 to the first printed circuit board 330.

In an embodiment, the flexible board 362 may include a connection area 3622. The connection area 3622 may include an area in which the connection terminal 363 and the flexible board 362 are bent and connected. In the connection area 3622, at least a portion of the flexible board 362 may be bent and extended in the height direction (e.g., the z-axis direction).

In an embodiment, since the flexible board 362 is bent and extended on the connection area 3622, the flexible board 362 and the connection terminal 363 may have a step therebetween in the height direction (e.g., the z-axis direction). The step of the flexible board 362 and the connection terminal 363 in the height direction (e.g., the z-axis direction) may be substantially identical to a thickness of the printed circuit board (e.g., the first printed circuit board 330).

Figure 6:
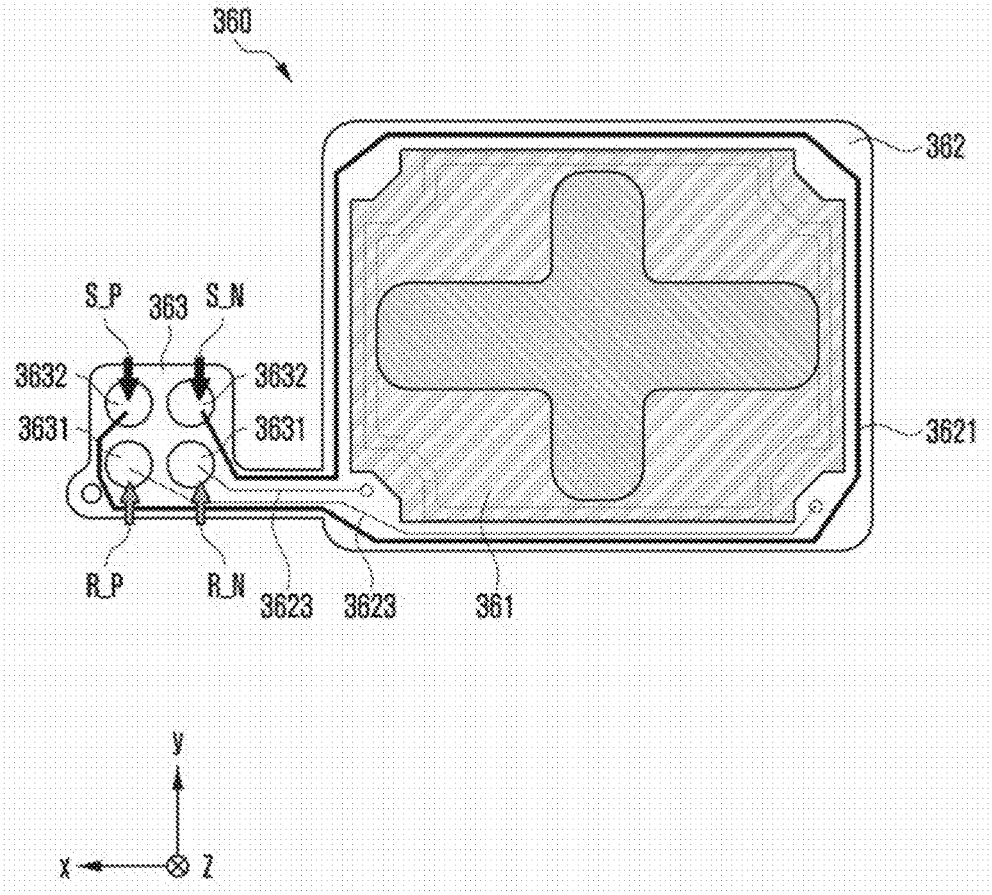
FIG. 6 illustrates a first speaker according to an embodiment of the disclosure.

FIG. 6 illustrates the first speaker 360 according to an embodiment of the disclosure.

Referring to FIG. 6, the connection terminal 363 according to an embodiment may include a first terminal 3631 and a second terminal 3632. The connection terminal 363 may include each pair of first terminals 3631 and second terminals 3632. For example, the first terminal 3631 may include a positive terminal R_P and a negative terminal R_N. The second terminal 3632 may include a positive terminal S_P and a negative terminal S_N.

In an embodiment, the first terminal 3631 may correspond to a terminal configured to electrically connect the coil area 361 and the first amplifier 381. The first terminal 3631 may be electrically connected to the coil area 361 through a coil connection conductive wire 3623. For example, a current introduced from the first amplifier 381 may be transferred to a coil positioned inside the coil area 361 through the coil connection conductive wire 3623.

In an embodiment, the second terminal 3632 may correspond to a terminal configured to electrically connect the wire 3621 and the second amplifier 382. For example, a pair of second terminals 3632 may be connected to terminals of the wire 3621, respectively. A current introduced from the second amplifier 382 may flow to the wire 3621 through the second terminal 3632.

In an embodiment, the wire 3621 may establish a current path from one second terminal (e.g., S_P) 3632 to the other second terminal (e.g., S_N) 3632. For example, the current introduced from the second amplifier 382 may flow along a direction in which the wire 3621 extends from the positive terminal S_P of the second terminal 3632 to the negative terminal S_N of the second terminal 3632.

In an embodiment, the wire 3621 may extend to surround at least a portion of the coil area 361. The wire 3621 may extend to surround the outer portion of the coil area 361 and may establish a path through which a current flows on the outer portion of the coil area 361.

In an embodiment, an amount of the current flowing through the wire 3621 may be determined based on an amount of the current flowing through the coil area 361. A processor (e.g., 120, see FIG. 1) of the electronic device 300 may determine the amount of the current flowing through the wire 3621, based on the amount of the current flowing through the coil area 361.

In case that the electronic device 300 operates in the handset mode, an H-field may be generated by a power (e.g., radio frequency (RF) power) current of the electronic device 300. The H-field generated by the power current may cause a first current to flow through a coil inside the first speaker 360, and thus, generate noise. The electronic device 300 according to an embodiment may cause a second current to flow through the wire 3621 to offset the H-field generated by the power current.

FIG. 6 illustrates that the first speaker 360 includes the flexible board 362 including the wire 3621, but this is merely exemplary, and the flexible board 362 including the wire 3621 may be configured separately from the first speaker 360. In this case, the flexible board 362 including the wire 3621 may be disposed to surround the outside of the first speaker 360.

Figure 7:
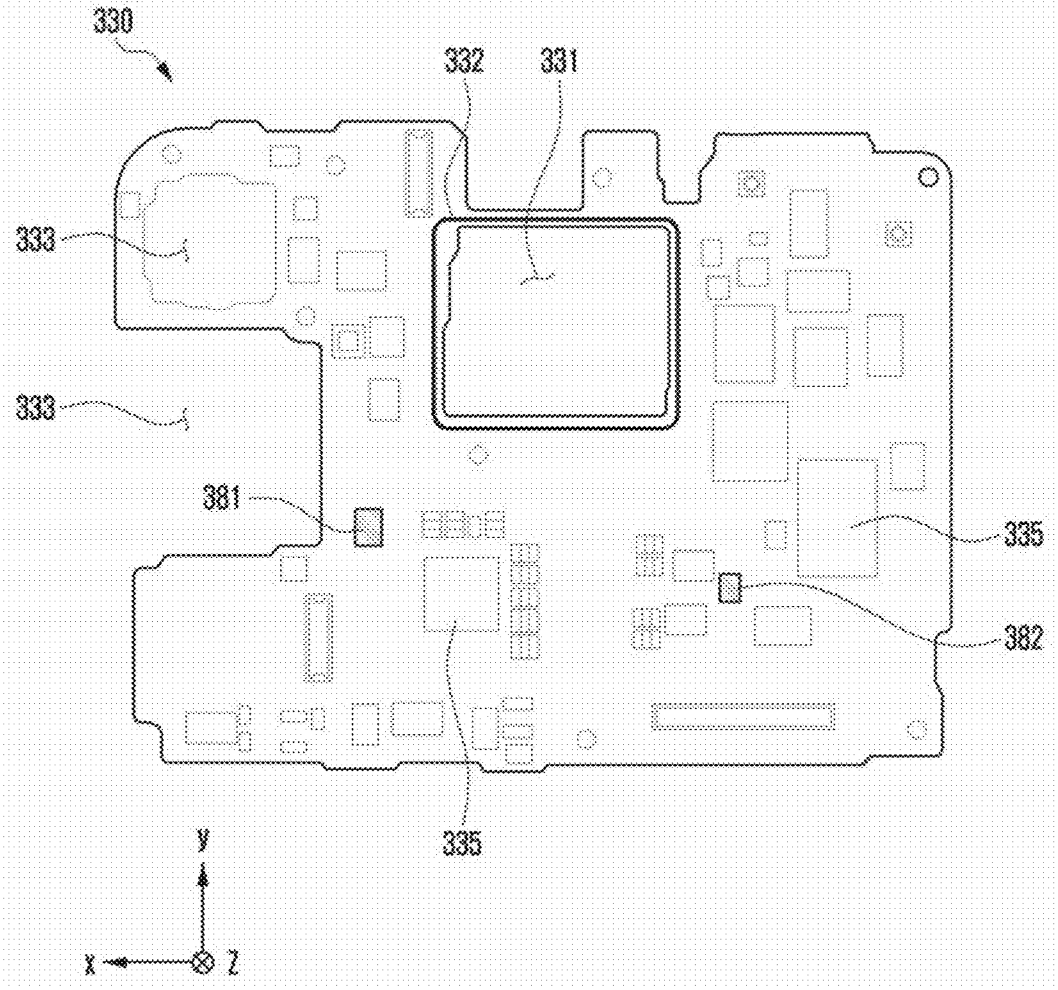
FIG. 7 illustrates a printed circuit board according to an embodiment of the disclosure.

FIG. 7 illustrates the first printed circuit board 330 according to an embodiment of the disclosure.

According to an embodiment of the disclosure, the first printed circuit board 330, the width direction of the first printed circuit board 330 may represent the x-axis direction and the lengthwise direction of the first printed circuit board 330 may represent the y-axis direction.

Referring to FIG. 7, the first printed circuit board 330 according to an embodiment may include a speaker opening area 331, a conductive pattern 332, and a camera opening 333.

In an embodiment, the speaker opening area 331 may correspond to an opening area through which the speakers (the first speaker 360 and the second speaker 370) is disposed. For example, the first speaker 360 may be disposed through the speaker opening area 331. In an embodiment, the camera opening 333 may correspond to an opening area through which the camera 391 (see FIG. 3) is disposed.

In an embodiment, the conductive pattern 332 may be configured to surround the speaker opening area 331. For example, the conductive pattern 332 may extend along the width direction and the lengthwise direction of the first printed circuit board 330 around the speaker opening area 331. The conductive pattern 332 according to an embodiment is configured to surround the speaker opening area 331 through which the first speaker 360 is disposed, and thus, may extend to surround the first speaker 360.

In an embodiment, the first amplifier 381, the second amplifier 382, and the electronic component 335 may be disposed on a surface of the first printed circuit board 330. In another embodiment, the first amplifier 381, the second amplifier 382, and the electronic component 335 may be disposed on a surface of the second printed circuit board 340.

The first amplifier 381 may be electrically connected to the first speaker 360 (see FIG. 3). The second amplifier 382 may be electrically connected to the first speaker 360 (see FIG. 3) and/or the second speaker 370 (see FIG. 3). The electronic component 335 may correspond to or include the processor 120 and/or the memory 130 in FIG. 1.

In an embodiment, a current may flow along the conductive pattern 332. For example, the second amplifier 382 may be connected to the conductive pattern 332 and the current introduced from (or generated by) the second amplifier 382 may flow through the conductive pattern 332.

In an embodiment, in case that the electronic device 300 operates in the handset mode, an H-field may be generated by a power (e.g., radio frequency (RF) power) current of the electronic device 300. According to an embodiment, the electronic device 300 (specifically, the second amplifier 382) may cause a current and flow to the conductive pattern 332 in the handset mode of the electronic device 300. In case that the current flows through the conductive pattern 332 extending to surround the first speaker 360 (see FIG. 6), the H-field generated by the power current may be offset, thus relevant noise may be reduced or removed.

Figure 8:
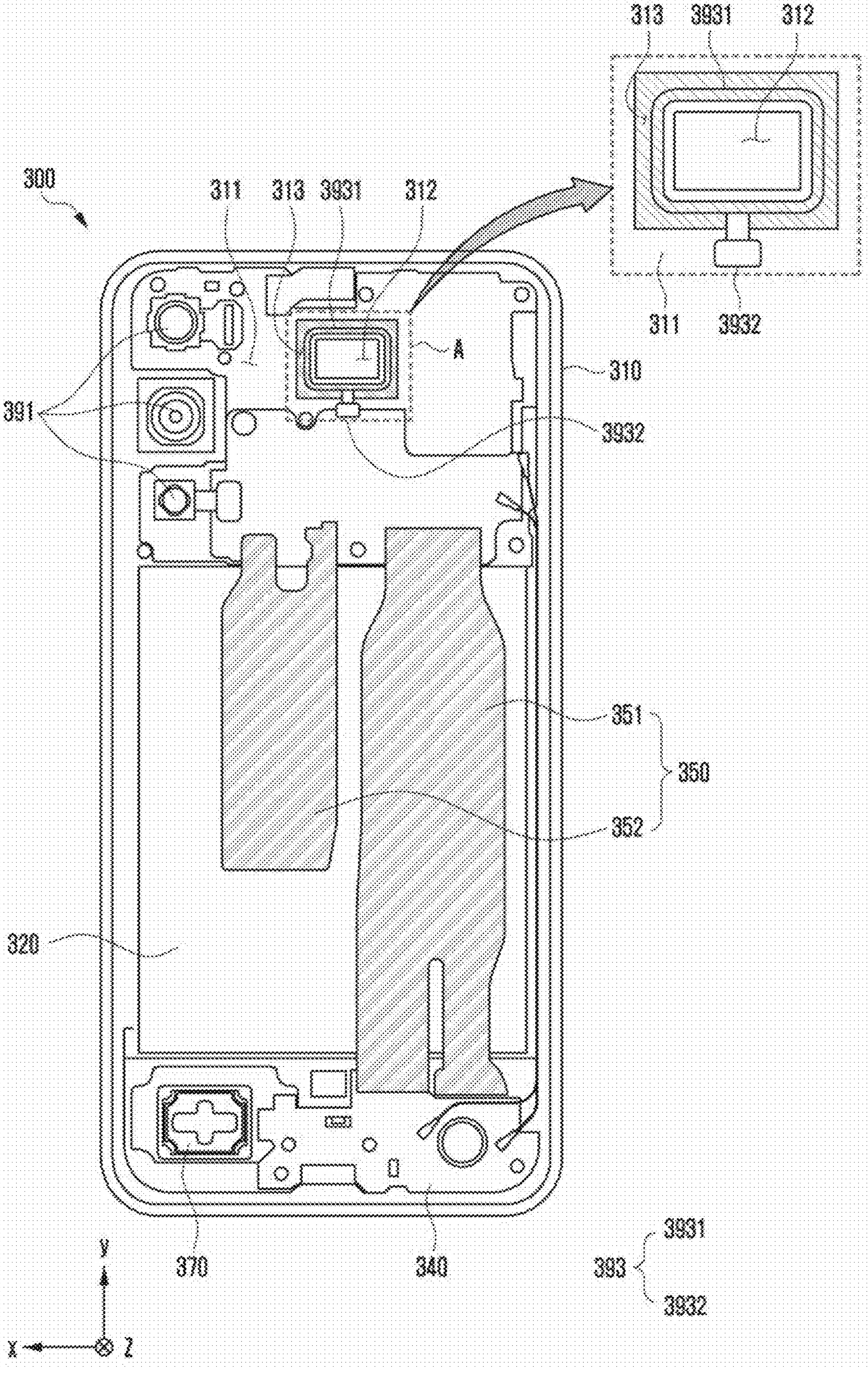
FIG. 8 illustrates a housing according to an embodiment of the disclosure.

FIG. 8 illustrates the housing 310 according to an embodiment of the disclosure. FIG. 8 illustrates the housing 310 in which the first printed circuit board 330 (see FIG. 3) is not disposed.

In an embodiment, the housing 310 may include a first disposition area 311, a second disposition area 312, and a conductive wire disposition area 313.

In an embodiment, the first disposition area 311 may correspond to an area in which the first printed circuit board 330 or the second printed circuit board 340 (see FIG. 3) is disposed. In an embodiment, the first printed circuit board 330 (see FIG. 3) may be disposed in the first disposition area 311.

In an embodiment, the second disposition area 312 may correspond to an area in which the first speaker 360 (see FIG. 6) is disposed. For example, the first speaker 360 may be disposed in the second disposition area 312.

In an embodiment, the first disposition area 311 may be disposed to surround the second disposition area 312. For example, the first disposition area 311 may be configured on the outer portion of the second disposition area 312.

In an embodiment, the conductive wire disposition area 313 may correspond to an area configured between the first disposition area 311 and the second disposition area 312. For example, the conductive wire disposition area 313 may correspond to an area between the first speaker 360 (see FIG. 6) and the first printed circuit board 330 (see FIG. 3).

In an embodiment, the electronic device 300 may include a coil board 393. The coil board 393 may correspond to a flexible printed circuit board including a wire through which a current flows. A current may flow along a direction in which the coil board 393 extends.

An area 'A' shown in FIG. 8 may indicate an area in which the second disposition area 312, the conductive wire disposition area 313, and the coil board 393 are disposed in the housing 310.

In an embodiment, referring to the area 'A' in FIG. 8, the coil board 393 may be disposed in the conductive wire disposition area 313. The coil board 393 may be disposed between the first disposition area 311 and the second disposition area 312.

In case that the first speaker 360 (see FIG. 6) is disposed in the housing 310 according to an embodiment, the coil board 393 may extend along a circumference of the first speaker 360 on the outer portion of the first speaker 360.

In an embodiment, the coil board 393 may include a wire area 3931 and/or a connection terminal area 3932. The wire area 3931 may correspond to an area in which a wire included in the coil board 393 is disposed. The wire may be disposed to extend along a direction in which the wire area 3931 is configured.

In an embodiment, the connection terminal area 3932 may correspond to an area in which the coil board 393 and the first printed circuit board 330 (see FIG. 3) are connected. For example, the coil board 393 may be electrically connected to the first printed circuit board 330 (see FIG. 3) in the connection terminal area 3932.

In an embodiment, a current may flow along the coil board 393. For example, the second amplifier 382 may be connected to the coil board 393 and the current introduced from the second amplifier 382 may flow through the wire area 3931 of the coil board 393.

The electronic device 300 according to an embodiment may cause a current to flow from the second amplifier 382 to the wire area 3931 of the coil board 393 in the handset mode of the electronic device 300. As the current flows through the wire area 3931 of the coil board 393 extending to surround the first speaker 360 (see FIG. 6), the H-field generated by the power current (e.g., radio frequency (RF) power) may be offset.

Figure 9:
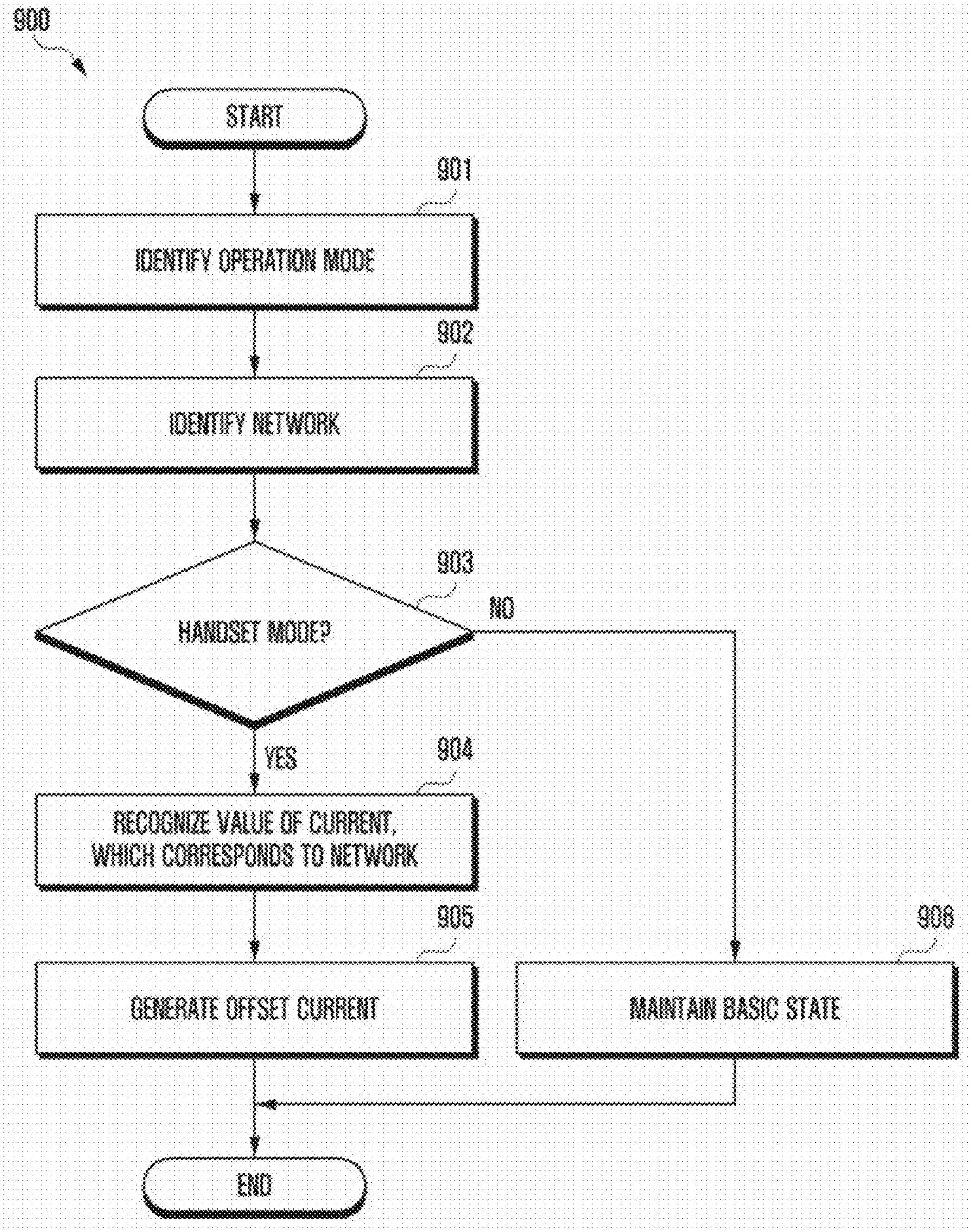
FIG. 9 illustrates a current control method according to an embodiment of the disclosure.

FIG. 9 illustrates a current control method 900 according to an embodiment of the disclosure.

In an embodiment, the current control method 900 may be performed according to the flowchart shown in FIG. 9. The flowchart shown in FIG. 9 is merely an example according to an embodiment of the current control method 900 and the order of each operation may be changed or performed simultaneously.

In an embodiment, each operation of the current control method 900 may be performed by at least one processor (e.g., the processor 120 in FIG. 1) of the electronic device 300.

The current control method 900 according to an embodiment of the disclosure may include operation 901 of identifying operation mode of the electronic device, operation 902 of identifying a network used by the electronic device, operation 903 of determining whether the operation mode of the electronic device is a handset mode, operation 904 of recognizing a value of a current flowing through a speaker in response to the network used by the electronic device, operation 905 of causing a current to flow through a wire surrounding an outer portion of the speaker, and operation 906 of maintaining a basic state.

The current control method 900 according to an embodiment may start when the electronic device 300 performs a call operation. For example, in case that the user of the electronic device 300 performs the call operation by using the electronic device 300, the current control method 900 shown in FIG. 9 may be performed.

In operation 901 of identifying the operation mode, under the control of the processor 120, the electronic device 300 according to an embodiment may recognize the operation mode of the electronic device 300. For example, in case that the electronic device 300 performs the call operation, the electronic device 300 may be operated in the speaker phone mode or the handset mode. In case that the electronic device 300 performs the call operation, the electronic device 300 may identify in which mode (e.g., the speaker phone mode, or the handset mode) the electronic device 300 operates in operation 901.

In operation 902 of identifying the network, under the control of the processor 120, the electronic device 300 according to an embodiment may identify a type of the network used by the electronic device 300. For example, the electronic device 300 may identify a type of the network (e.g., 3G, LTE, or 5G) used by the electronic device 300 when the electronic device 300 performs the call operation.

In operation 903 of determining whether the electronic device is in the handset mode, under the control of the processor 120, the electronic device 300 according to an embodiment may determine whether the electronic device 300 operates in the handset mode. In case that the electronic device 300 is determined to operate in the handset mode, under the control of the processor 120, the electronic device 300 according to an embodiment may perform operation 904 of recognizing a value of a current, which corresponds to the network. In case that the electronic device 300 is determined not to operate in the handset mode, under the control of the processor 120, the electronic device 300 according to an embodiment may cause the electronic device 300 to perform operation 906 of maintaining the basic state.

In operation 904 of identifying the value of the current, which corresponds to the network, under the control of the processor 120, the electronic device 300 according to an embodiment may recognize a value of a current flowing through the first speaker 360 in response to the network used by the electronic device 300.

In an embodiment, the value of the current flowing through the first speaker 360 may indicate a value of a current flowing through a coil inside the first speaker 360.

In an embodiment, the electronic device 300 may generate a data set in which the value of the current flowing through the first speaker 360 is stored for each network used by the electronic device 300. The data set may include a set in which the value of the current flowing through the first speaker 360 depending on the network used by the electronic device 300 and/or the type (e.g., the model of the electronic device 300) of the electronic device 300 is stored through simulations or actual measurements. For example, the data set may include a current value for each network used by the electronic device 300 and a current value for each type of electronic device 300.

In an embodiment, the electronic device 300 may recognize, from the stored data set, the value of the current flowing through the first speaker 360, based on the network used by the electronic device 300.

In operation 905 of generating an offset current, under the control of the processor 120, the electronic device 300 according to an embodiment may cause a current to flow through a wire surrounding the first speaker 360. The offset current flows through a wire surrounding the first speaker 360 and may indicate a current to offset the H-field due to the power current.

In an embodiment, an amount of the offset current generated by the electronic device 300 may be determined based on the value of the current flowing through the first speaker 360, which is recognized in operation 904 of recognizing the value of the current, which corresponds to the network. In operation 905 of operating the offset current, the electronic device 300 may electrically connect the second amplifier 382 to the first speaker 360 to cause the offset current to flow through the wire surrounding the first speaker 360.

In operation 906 of maintaining the basic state, under the control of the processor 120, the electronic device 300 according to an embodiment may cause the electronic device 300 to maintain the basic state. The basic state of the electronic device 300 may refer to a state in which the second amplifier 382 and the first speaker 360 are not connected. In operation 906 of maintaining the basic state, under the control of the processor 120, the electronic device 300 may not perform operation 904 of recognizing the value of the current, which corresponds to the network.

Figure 10:
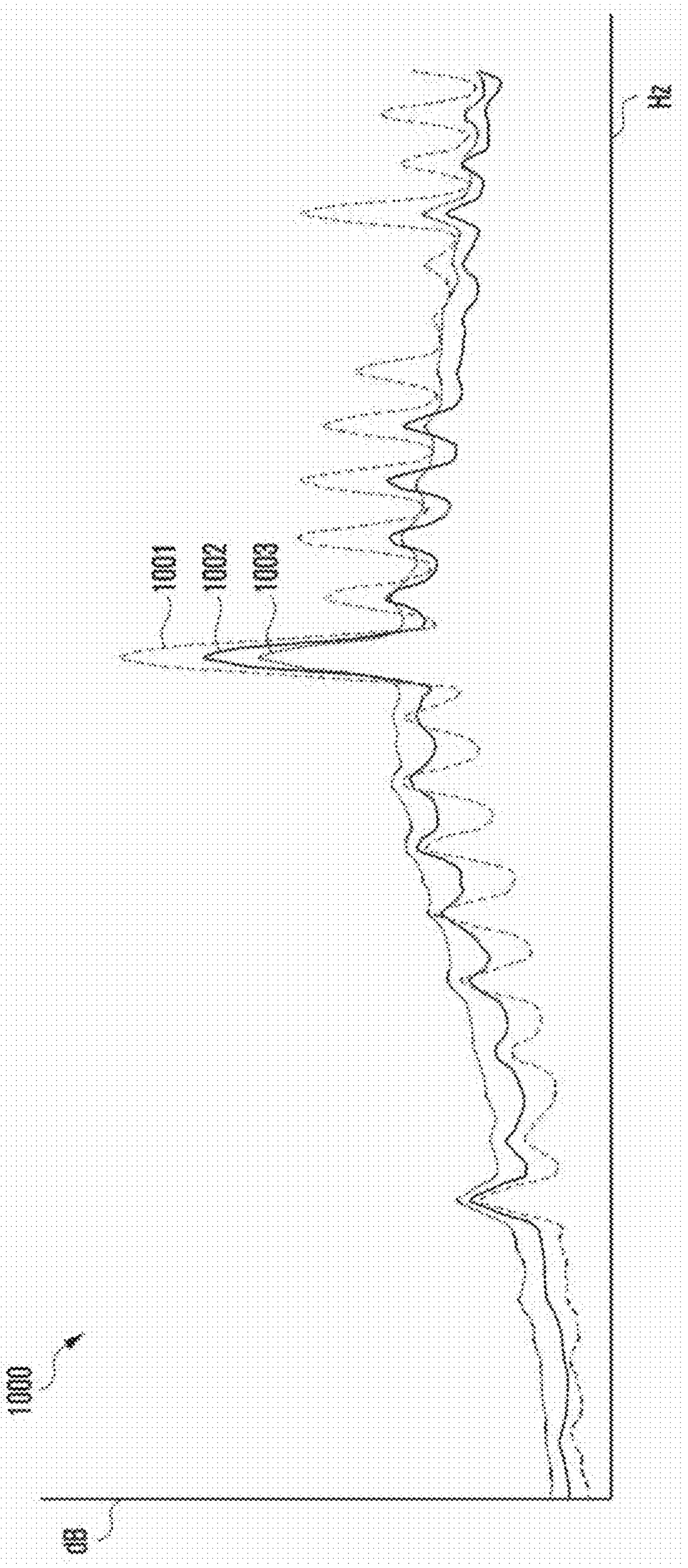
FIG. 10 illustrates a noise level of an electronic device according to an embodiment of the disclosure.

FIG. 10 is a graph showing a noise level 1002 or 1003 of an electronic device according to an embodiment of the disclosure.

The horizontal axis of a graph 1000 shown in FIG. 10 may indicate a frequency (e.g., hertz (Hz)) of the first speaker 360 of the electronic device 300. The vertical axis of the graph shown in FIG. 10 may indicate a level (e.g., decibel (dB)) of noise generated in the first speaker 360.

In case that the electronic device 300 operates in the handset mode, the current flowing through the first speaker 360 may cause noise in the first speaker 360. The greater the noise generated in the first speaker 360, the greater the noise recognized by the user of the electronic device 300 may be.

In the handset mode of the electronic device 300, the electronic device 300 according to an embodiment may cause a current to flow through the wire 3621 (see FIG. 6) extending along the circumference of the first speaker 360 to reduce noise generated in the first speaker 360.

Referring to the graph 1000 in FIG. 10, in the handset mode of the electronic device 300, a first noise level 1001 may indicate a noise level of the case in which a current does not flow around the first speaker 360. In the handset mode of the electronic device 300, a second noise level 1002 may indicate a noise level of the case in which a current flows through the wire 3621 (see FIG. 6) extending along the circumference of the first speaker 360. In the handset mode of the electronic device 300, a third noise level 1003 may indicate a noise level of the case in which a current of which amount is greater than the case of the second noise level 1002 flows through the wire 3621 (see FIG. 6) extending along the circumference of the first speaker 360.

Referring to the graph 1000 in FIG. 10, the second noise level 1002 and the third noise level 1003 may be configured to be smaller than the first noise level 1001. The configuration of the second noise level 1002 and the third noise level 1003 to be smaller than the first noise level 1001 may indicate that the noise generated in the first speaker 360 is reduced when a current flows through the wire 3621 (see FIG. 6) extending along the circumference of the first speaker 360.

The electronic device 300 according to an embodiment may cause a current to flow along the circumference of the first speaker 360 to reduce the noise generated in the first speaker 360, thereby improving the call quality of the electronic device 300.

An electronic device 300 according to an embodiment of the disclosure may include the housing 310, the first speaker 360 disposed in the housing 310, and the first printed circuit board 330 disposed in the housing 310 to surround at least a portion of the first speaker 360, and the first speaker 360 may include a coil area 361 in which a coil for operation of the speaker is disposed, a flexible board 362 which includes a wire 3621 extending to surround at least a portion of the coil area 361 and is disposed on an outer portion of the coil area, and a connection terminal 363 disposed at one end of the flexible board 362 and electrically connected to the first printed circuit board 330.

In an embodiment, the second speaker 370 may be disposed (in the electronic device 300) at a position different from a position of the first speaker 360.

In an embodiment, the electronic device 300 may further include the first amplifier 381 connected to the first speaker 360 and the second amplifier 382 connected to the second speaker 370.

In an embodiment, when the electronic device 300 is operated in the handset mode, the second amplifier 382 may be connected to the wire 3621 and the second speaker 370.

In an embodiment, the connection terminal 363 may include a pair of first terminals 3631 and a pair of second terminals 3632.

In an embodiment, the pair of first terminals 3631 may electrically connect the coil area 361 and the first amplifier 381, and the pair of second terminals 3632 may electrically connect the wire 3621 and the second amplifier 382.

In an embodiment, the electronic device 300 may further include the processor 120 that may recognize a value of a current flowing through the first speaker 360, based on a network used by the electronic device when the electronic device 300 is operated in the handset mode and cause the current to flow through the wire 3621 based on the value of the current.

In an embodiment, the processor 120 may recognize, from a data set stored in the electronic device 300, the value of the current corresponding to the network used by the electronic device 300.

In an embodiment, the data set may include a current value for each network used by the electronic device 300 and a current value for each type of electronic device.

An electronic device 300 according to an embodiment of the disclosure may include a housing 310, a speaker 360 disposed in the housing 310, and the first printed circuit board 330 including a speaker opening area 331 surrounding the first speaker 360 and disposed in the housing 310, and the first printed circuit board 330 may include a conductive pattern 332 extending to surround an outer portion of the first speaker 360.

In an embodiment, the second speaker 370 may be disposed (in the electronic device 300) at a position different from a position of the first speaker 360. The first amplifier 381 may be connected to the first speaker 360, and the second amplifier 382 may be connected to the second speaker 370.

In an embodiment, in case that the electronic device 300 is operated in the handset mode, the second amplifier 382 may be connected to the conductive pattern 332 and the second speaker 370.

In an embodiment, the electronic device 300 may further include the processor 120 that may recognize a value of a current flowing through the first speaker 360 based on a network used by the electronic device 300 when the electronic device 300 is operated in the handset mode and cause the current to flow through the conductive pattern 332 based on the value of the current.

In an embodiment, the processor 120 may recognize, from a data set prestored in the electronic device 300, the value of the current corresponding to the network used by the electronic device 300.

In an embodiment, the data set may include a current value for each network used by the electronic device 300 and a current value for each type of electronic device 300.

An electronic device 300 according to an embodiment of the disclosure may include the housing 310, a speaker 360 disposed in the housing 310, the first printed circuit board 330 including a speaker opening area 331 surrounding the first speaker 360 and disposed in the housing 310, and the coil board 393 extending to surround an outer portion of the first speaker 360 between the first speaker 360 and the first printed circuit board 330.

In an embodiment, when the electronic device 300 is operated in the handset mode, the second amplifier 382 may be connected to the first speaker 360 and the second speaker 370.

The current control method 900 of an electronic device according to an embodiment of the disclosure may include operation 901 of identifying operation mode of the electronic device, operation 902 of identifying a network used by the electronic device, operation 903 of determining whether operation mode of the electronic device is a handset mode, operation 904 of recognizing a value of a current flowing through a speaker in response to the network used by the electronic device when the operation mode of the electronic device is the handset mode, and operation 905 of causing the current determined based on the value of the current to flow through a wire 3621 extending to surround an outer portion of the first speaker 360.

In an embodiment, in operation 904 of recognizing the value of the current flowing through the speaker in response to the network used by the electronic device, the value of the current flowing through the first speaker 360 in response to the network used by the electronic device 300 may be recognized from a data set stored in the electronic device 300.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. The electronic devices according to embodiments of the disclosure are not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., module or program) of the above-described components may include a singular or a plurality of entities, and some of the plurality of entities may be separately disposed in any other component. According to an embodiment, one or more components or operations among the above-described components may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component among the plurality of components prior to the integration.

According to an embodiment, operations performed by a module, program, or other component may be executed sequentially, in parallel, repeatedly, or heuristically, or one or more of the operations may be executed in a different order or omitted, or one or more other operations may be added.

What is claimed is:

1. An electronic device comprising:
a housing;
a first speaker in the housing; and
a printed circuit board in the housing and surrounding at least a portion of the first speaker,
wherein the first speaker comprises:
a coil area in which a coil for an operation of the first speaker is disposed;
a flexible board on an outer portion of the coil area and comprising a wire surrounding at least a portion of the coil area; and
a connection terminal at one end of the flexible board and electrically connected to the printed circuit board, and
wherein the wire is configured such that an offset current supplied from the printed circuit board flows through the wire to reduce noise generated from the first speaker.

2. The electronic device of claim 1, further comprising a second speaker at a position different from a position of the first speaker.

3. The electronic device of claim 2, further comprising:
a first amplifier connected to the first speaker; and
a second amplifier connected to the second speaker.

4. The electronic device of claim 3, wherein in case that the electronic device is operated in a handset mode, the second amplifier is connected to the wire and the second speaker.

5. The electronic device of claim 3, wherein the connection terminal comprises a pair of first terminals and a pair of second terminals.

6. The electronic device of claim 5, wherein the pair of first terminals electrically connect the coil area and the first amplifier, and
wherein the pair of second terminals electrically connect the wire and the second amplifier.

7. The electronic device of claim 1, further comprising at least one processor configured to, in case that the electronic device is operated in a handset mode, recognize a value of a first current flowing through the first speaker based on a network used by the electronic device and cause a second current to flow through the wire based on the value of the first current.

8. The electronic device of claim 7, wherein the at least one processor is further configured to recognize, from a data set stored in the electronic device, the value of the first current, which corresponds to the network used by the electronic device.

9. The electronic device of claim 8, wherein the data set comprises a value of a current for each network used by the electronic device and a value of a current for each type of the electronic device.

10. An electronic device comprising:

a housing;

a wire;

a first speaker in the housing; and a printed circuit board in the housing and comprising a speaker opening area surrounding the first speaker, wherein the printed circuit board comprises a conductive pattern surrounding an outer portion of the first speaker, wherein the wire is configured such that an offset current supplied from the printed circuit board flows through the wire to reduce noise generated from the first speaker.

11. The electronic device of claim 10, further comprising:

a second speaker at a position different from a position of the first speaker;

a first amplifier connected to the first speaker; and a second amplifier connected to the second speaker.

12. The electronic device of claim 11, wherein, in case that the electronic device is operated in a handset mode, the second amplifier is connected to the conductive pattern and the second speaker.

13. The electronic device of claim 10, further comprising at least one processor configured to, in case that the electronic device is operated in a handset mode, recognize a value of a first current flowing through the first speaker based on a network used by the electronic device and cause a second current to flow through the conductive pattern based on the value of the first current.

14. The electronic device of claim 13, wherein the at least one processor is further configured to recognize, from a data set prestored in the electronic device, the value of the first current, which corresponds to the network used by the electronic device.

15. The electronic device of claim 14, wherein the data set comprises a value of a current for each network used by the electronic device and a value of a current for each type of the electronic device.

16. An electronic device comprising:

a housing;

a wire;

a first speaker in the housing;

a printed circuit board in the housing and comprising a speaker opening area surrounding the first speaker; and a coil board surrounding an outer portion of the first speaker between the first speaker and the printed circuit board, wherein the wire is configured such that an offset current supplied from the printed circuit board flows through the wire to reduce noise generated from the first speaker.

17. The electronic device of claim 16, further comprising:

a second speaker at a position different from a position of the first speaker;

a first amplifier connected to the first speaker; and a second amplifier connected to the second speaker.

18. The electronic device of claim 17, wherein in case that the electronic device is operated in a handset mode, the second amplifier is connected to the first speaker and the second speaker.

19. A method of an electronic device, the method comprising:

identifying an operation mode of the electronic device;

identifying a network used by the electronic device;

determining whether the operation mode of the electronic device is a handset mode;

based on the operation mode being the handset mode, recognizing a value of a first current flowing through a speaker, based on the network used by the electronic device; and based on the value of the first current, generating a second current to flow through a wire extending to surround an outer portion of the speaker.

20. The method of claim 19, wherein the recognizing the value of the first current comprises recognizing, from a data set stored in the electronic device, the value of the first current.

* * * * *